US009959144B2

(12) United States Patent
Callegari et al.

(10) Patent No.: US 9,959,144 B2
(45) Date of Patent: May 1, 2018

(54) OPTIMIZING COMPUTER HARDWARE RESOURCE UTILIZATION WHEN PROCESSING VARIABLE PRECISION DATA

(71) Applicant: Landmark Graphics Corporation, Houston, TX (US)

(72) Inventors: Andres C. Callegari, Cypress, TX (US); Genbao Shi, Sugar Land, TX (US); Michael Dunn, Houston, TX (US); Joe Lynch, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days. days.

(21) Appl. No.: 14/769,428

(22) PCT Filed: Aug. 20, 2014

(86) PCT No.: PCT/US2014/051923
§ 371 (c)(1),
(2) Date: Aug. 20, 2015

(87) PCT Pub. No.: WO2016/028293
PCT Pub. Date: Feb. 25, 2016

(65) Prior Publication Data
US 2017/0153926 A1    Jun. 1, 2017

(51) Int. Cl.
*G06F 9/50*         (2006.01)
*G06T 17/10*        (2006.01)
(Continued)

(52) U.S. Cl.
CPC .......... *G06F 9/5044* (2013.01); *G06F 9/5016* (2013.01); *G06F 17/30569* (2013.01);
(Continued)

(58) Field of Classification Search
None
See application file for complete search history.

(56) References Cited

U.S. PATENT DOCUMENTS 5,790,134 A      8/1998  Lentz
6,552,723 B1 *   4/2003  Duluk, Jr. ................ G06T 1/60
                                              345/419

(Continued)

OTHER PUBLICATIONS

International Search Report and Written Opinion, dated May 13, 2015, 12 pages; Korean International Searching Authority.

(Continued)

*Primary Examiner* — Abu Zar Ghaffari

(57) ABSTRACT

Systems and methods for optimizing hardware resource utilization when processing variable-precision data are provided. Application data objects are processed using either a central processing unit (CPU) or the relatively lower precision data processing requirements of a dedicated math processing unit, e.g., a graphics processing unit (GPU), based on a level of precision determined for each application data object. The level of precision is used to calculate at least one bounding value for each application data object. The bounding value is compared to a selected precision threshold in order to determine whether the application data object can be processed by the GPU at a relatively lower level of precision without an undesirable loss of computational precision.

22 Claims, 7 Drawing Sheets

(51) Int. Cl.
  *G06T 17/30*   (2006.01)
  *G06F 17/30*   (2006.01)
  *G06F 3/14*    (2006.01)
  *G06T 15/00*   (2011.01)

(52) U.S. Cl.
  CPC ............... *G06T 17/10* (2013.01); *G06F 3/14* (2013.01); *G06T 15/00* (2013.01); *G06T 15/005* (2013.01)

(56) References Cited

U.S. PATENT DOCUMENTS

| | | | | |
|---|---|---|---|---|
| 6,631,783 | B2* | 10/2003 | Khan | G01V 1/006 |
| | | | | 181/105 |
| 6,842,765 | B2* | 1/2005 | Enenkel | G06F 7/483 |
| | | | | 708/495 |
| 6,891,546 | B1 | 5/2005 | Park et al. | |
| 7,075,530 | B2* | 7/2006 | D'Amora | G06T 15/50 |
| | | | | 345/419 |
| 7,466,316 | B1 | 12/2008 | Alben et al. | |
| 8,368,705 | B2* | 2/2013 | Green | G06T 15/005 |
| | | | | 345/501 |
| 8,549,529 | B1 | 10/2013 | Schildan et al. | |
| 9,001,114 | B1* | 4/2015 | Garrity | G06T 11/206 |
| | | | | 345/418 |
| 2005/0062762 | A1* | 3/2005 | Wang | G06T 15/00 |
| | | | | 345/643 |
| 2005/0065990 | A1* | 3/2005 | Allen | G06F 9/45504 |
| | | | | 708/495 |
| 2005/0271302 | A1 | 12/2005 | Khamene et al. | |
| 2006/0010454 | A1* | 1/2006 | Napoli | G06F 3/14 |
| | | | | 719/328 |
| 2006/0176199 | A1* | 8/2006 | Nishide | H03M 7/30 |
| | | | | 341/143 |
| 2007/0255500 | A1* | 11/2007 | Pita | G01V 1/30 |
| | | | | 702/11 |
| 2007/0294512 | A1* | 12/2007 | Crutchfield | G06F 8/443 |
| | | | | 712/200 |
| 2008/0024497 | A1* | 1/2008 | Crow | G06T 15/005 |
| | | | | 345/428 |
| 2008/0084420 | A1 | 4/2008 | Bakalash et al. | |
| 2009/0141034 | A1* | 6/2009 | Pryor | G06F 9/5044 |
| | | | | 345/522 |
| 2009/0167763 | A1* | 7/2009 | Waechter | G06T 15/06 |
| | | | | 345/426 |
| 2009/0189890 | A1* | 7/2009 | Corbett | G06F 9/505 |
| | | | | 345/419 |
| 2009/0192768 | A1* | 7/2009 | Zuo | G01N 33/2823 |
| | | | | 703/2 |
| 2010/0103180 | A1* | 4/2010 | Tamaoki | G06F 3/1431 |
| | | | | 345/522 |
| 2010/0300682 | A1* | 12/2010 | Thakur | E21B 43/16 |
| | | | | 166/250.01 |
| 2014/0098084 | A1* | 4/2014 | Subag | G06T 11/40 |
| | | | | 345/419 |

OTHER PUBLICATIONS

European Patent Office, Partial Supplementary European Search Report, dated Feb. 22, 2018, 23 pages, Europe.

* cited by examiner

OPTIMIZING COMPUTER HARDWARE RESOURCE UTILIZATION WHEN PROCESSING VARIABLE PRECISION DATA

CROSS-REFERENCE TO RELATED APPLICATIONS

This application is a U.S. National Stage patent application of International Patent Application No. PCT/US2014/051923, filed on Aug. 20, 2014, the benefit of which is claimed and the disclosure of which is incorporated herein by reference in its entirety.

FIELD OF THE DISCLOSURE

The present disclosure relates generally to the field of computer data processing and, more specifically, to techniques for managing computer hardware resource utilization when processing different pieces of data.

BACKGROUND

Software applications for large-scale data analysis and visualization have become essential tools for achieving business objectives in many industries. Such applications are generally used to quickly process large quantities of data to enable the data to be visualized or searched to find key insights, patterns, and important details about the data itself. In the oil and gas industry, for example, such applications may be used to generate computer simulation models of a petroleum reservoir in order to gain a better understanding of the reservoir's physical composition as well as its economic potential for hydrocarbon exploration and production. The computer models may be generated based on, for example, seismic data representative of the subsurface geological features including, but not limited to, structural unconformities, faults, and folds within different stratigraphic layers of the reservoir formation. The computer models may be used by petroleum engineers and geoscientists to visualize two-dimensional (2D), three-dimensional (3D), or four-dimensional (4D) representations of particular stratigraphic features of interest and to simulate the flow of petroleum or other fluids within the reservoir.

The processing requirements of data visualization and simulation applications generally include performing a substantial number of mathematical computations with varying levels of precision in a relatively short period of time. The level of precision used to process a piece of data for such an application may vary over a wide range depending on the particular binary format used to represent that data. An example of such a variable-precision binary data format is the Institute of Electrical and Electronics Engineers (IEEE) standard format for floating-point computations (or IEEE 754 standard). The range of different precision data formats defined by the IEEE 754 standard includes the 32-bit single-precision binary floating-point format, the 64-bit double-precision, and the 128-bit quadruple-precision binary floating-point formats. However, even higher precision binary floating-point formats, e.g., a 256-bit octuple-precision format, may be supported as well. Some application programs that utilize the IEEE 754 standard data formats to perform floating-point computations may also require a relatively high level of computational precision in addition to speed of execution. Examples of such applications include, but are not limited to, interactive 3D or 4D simulation and real-time 3D/4D graphics visualization, which may be used for gaming applications or scientific data analysis and visualization applications.

To optimize the performance and execution speed of such computation-intensive applications, computer data processing systems may include specialized hardware resources that can be used in conjunction with the central processing unit (CPU) to accelerate data processing and floating-point operations. Such hardware resources may include, for example, a dedicated graphics processing unit (GPU) or a mathematics co-processor having an array of floating-point processing units designed to operate in parallel to efficiently process large amounts of numerical data. For example, a data processing system may include one or more GPU units in the form of dedicated processors or specialized electronic circuits that operate in conjunction with the CPU units to provide hardware accelerated graphics processing and rendering functionality. The CPUs and GPUs in this example may be separate components of a graphics data processing pipeline in which the GPUs are configured to render processed graphics data to a display.

CPUs are great for processing sequential and branching code, but they are not very good for massive parallel computation of vector and scalar data. CPU hardware units typically include one or more processing cores, e.g., in the order of tens or dozens for some high-end workstations. Each GPU hardware unit, on the other hand, may include thousands of scalar and vector processing cores. While it is possible to use clusters or nodes of a thousand or more CPUs for a high-end processing system, the size and cost of such a system would grow exponentially high. Furthermore, the performance of such a high-end system may not scale as expected in many computation/visualization intensive workflows, as the different cluster/node components may have to be connected through less than optimal hardware components.

Although modern CPUs generally support 64-bit data formats, many of the GPUs in use today natively support only 32-bit single-precision data formats. While GPUs that offer native support for extended 64-bit double-precision or "full-precision" floating-point data formats are available, the use of such high-precision data formats for floating-point computations may negatively impact system performance. This is primarily due to the increased memory and bandwidth requirements associated with the relatively large data sizes of these floating-point formats and to the hardware implementation details. Consequently, those willing to compromise some data accuracy in favor of improved application performance may prefer to use 32-bit GPUs over the slower 64-bit GPUs. However, there are application contexts that require a higher level of precision than a 32-bit GPU can provide. In these cases, a portion of the floating-point operations may need to be performed by a 64-bit CPU in order to avoid any loss in computational precision that would lead to a significant reduction in the quality of the visualization presented to a user or to the user's experience in using the application.

In data processing/visualization systems using a combination of 32-bit GPU and 64-bit CPU hardware, the operations performed by the 64-bit CPU, particularly for graphics rendering and data visualization applications, may still require the use of a 32-bit floating-point application programming interface (API) associated with the 32-bit GPU hardware since it is the GPU that will ultimately be managing and creating the rendering information to be displayed. Accordingly, the CPU will be required to perform a number of additional memory allocations, transformations, and data conversion steps to appropriately process variable-precision floating-point data that eventually will be rendered/visualized by the GPU. Such additional operations performed by the CPU generally reduce the available system hardware resources and significantly increase application execution time for large data. Thus, data processing systems using different hardware resources (e.g., combination of 32-bit/64-bit GPUs and 64-bit CPUs) to support variable-precision floating-point data formats may experience significant performance issues.

DESCRIPTION OF ILLUSTRATIVE EMBODIMENTS

Figure 1:
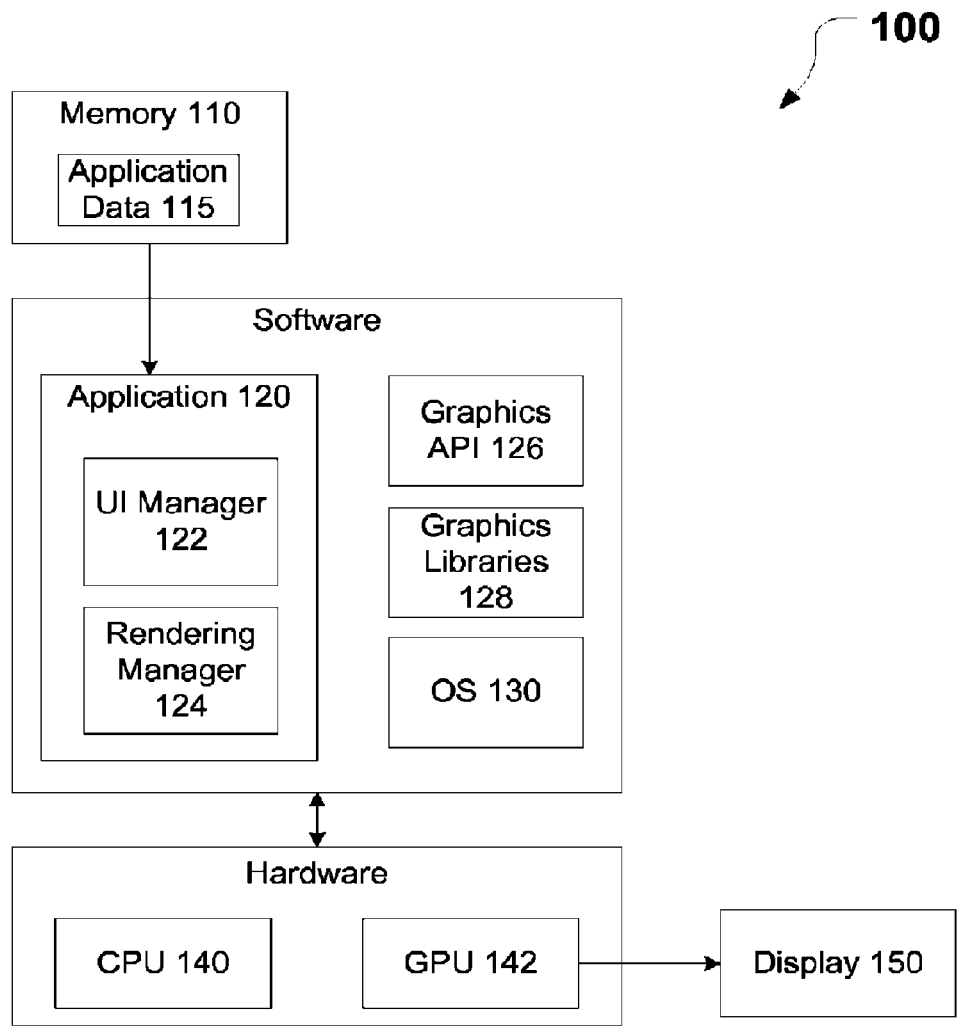
FIG. 1 is a block diagram of an exemplary computer system for optimizing hardware resource utilization when processing variable precision data.

Embodiments of the present disclosure are directed to optimizing hardware resource utilization when processing data with varying levels of precision on single or multiple processing systems. The hardware resources may include multiple data processing systems or a single system including multiple cores, which are each capable of processing data in the form of individual or atomic units. The level of precision of a particular piece of data (or "data object") may be based on, for example, the binary format used to represent the data as it is stored in memory or processed in a data processing system. Such variable-precision data formats may include, but are not limited to, single-precision (32-bit) and double-precision (64-bit) floating point binary data formats, e.g., as defined by a technical standard, such as the Institute of Electrical and Electronics Engineers (IEEE) standard for floating-point computation (or IEEE 754 standard). As will be described in further detail below, the techniques disclosed herein may be used to adaptively process application data objects by dynamically selecting the appropriate hardware resource or processing unit to utilize for processing each individual data object based on a level of precision determined for that data object. Such data processing may include performing different computations and other types of operations using variable-precision floating-point data.

In one example, a data visualization system used for rendering applications data may include a 32-bit graphics processing unit (GPU) in addition to a 64-bit general-purpose central processing unit (CPU). The application data in this example may be segmented into relatively smaller data chunks or data objects. Each data object may be processed as an individual or atomic data unit, which may be represented using any of the above-described variable precision floating-point data formats. The GPU may be a dedicated processor or specialized electronic circuit that operates in conjunction with the CPU to provide hardware accelerated graphics processing and rendering functionality. The CPU and GPU may be, for example, separate components of a graphics processing pipeline in which the GPU may be configured to render processed graphics data to a display device coupled to the system or to a data storage device. In some embodiments, the CPU and GPU may be implemented as separate cores of a single hybrid processing unit, where the latter processing unit may have "n" number of CPU cores and "m" number of GPU cores for balancing and maximizing the computing capabilities of the processor. Also, in some cases, the GPU may be used to perform the same computations as the CPU. Accordingly, the GPU may be used as a vector/scalar hardware acceleration unit that can be used not only for graphical data processing but also for accelerating computations performed by the CPU. The native binary data format supported by the CPU in this example may be the 64-bit double-precision floating point data format of the IEEE 754 standard, while the GPU may optimally support operations using only the 32-bit single-precision floating point data format of the IEEE 754 standard. Consequently, any 64-bit data processed by the CPU generally needs to be converted to a 32-bit data format prior to being sent to the GPU for final processing and rendering. In order to avoid any significant or undesirable loss of data precision during computations, e.g., below a desired level of precision, the CPU may be configured to perform the necessary floating-point calculations for processing the data in the 64-bit double-precision format prior to converting it to the 32-bit single-precision format for the GPU. However, the calculations performed by the CPU using 64-bit data may cause unnecessary memory allocations, reduced bandwidth, and performance bottlenecks. Moreover, these calculations may have to be reapplied to the entire data whenever any previously used calculation parameter is changed. The techniques described herein may therefore be used to dynamically select between computations performed using the 64-bit CPU cores and computations performed using the 32-bit GPU cores for processing each of a plurality of data objects involving floating-point computations based on a desired level of precision for a particular data object. These techniques allow the computer data processing system to be optimally tuned in order to optimize hardware resource utilization while minimizing unwanted loss in computational precision. These techniques also allow the processed data to be reused without having to reprocess most or all of the data as a result of any changes made to a calculation parameter.

As noted above, in some embodiments, the CPU and GPU may be separate cores of a hybrid processor that natively merges the CPU and GPU processing capabilities into a single processing architecture. Such processors may provide large scale vector and scalar processing capabilities that are seamlessly and natively built into the processor architecture itself, without requiring any specialized co-processing hardware units. In such a hybrid processor, the data processing functionalities of the CPU and GPU may be divided between separate cores of the hybrid processor. For example, separate cores within the hybrid processing unit may be designated to perform the types of data processing operations traditionally performed by either the CPU or GPU. It should further be noted that the separate data processing functionality described herein can also be performed within a farm of local and/or remote processing hardware, where the data is broken into smaller pieces and each piece processed by a selected processing entity.

While the examples provided herein may be described in the context of graphics visualization tools or applications for processing and rendering graphics data, it should be noted that the techniques disclosed herein are not intended to be limited thereto and that these techniques may be applied to other types of applications including, for example, any application involving floating-point computations using different floating-point binary data formats of varying levels of precision. Also, while the examples provided herein may be described in the context of visualization application for petroleum reservoir modeling, it should be noted that the embodiments of present disclosure are not intended to be limited thereto.

In the interest of clarity, not all features of an actual implementation or methodology are described in this specification. Also, the "exemplary" embodiments described herein refer to examples of the present disclosure. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of this disclosure will become apparent from consideration of the following description and drawings.

It would also be apparent to one of skill in the relevant art that the embodiments, as described herein, can be implemented in many different embodiments of software, hardware, firmware, or a combination thereof and may be implemented in one or more computer systems or other processing systems. Any actual software code used for the specialized control of hardware to implement embodiments is not limiting of the detailed description. Thus, the operational behavior of embodiments will be described with the understanding that modifications and variations of the embodiments are possible, given the level of detail presented herein.

FIG. 1 is a block diagram of an exemplary computer system 100 for optimizing hardware resource utilization when processing variable precision data. As shown in FIG. 1, system 100 includes a memory 110 for storing application data 115, a set of software and hardware components for processing data, and a display 150. The software in this example includes an application 120, a graphics application programming interface (API) 126, one or more graphics libraries 128, and an operating system (OS) 130. The data processing hardware includes a central processing unit (CPU) 140 and a graphics processing unit (GPU) 142. Memory 110 may be any type of computer-readable storage medium coupled to or integrated with system 100 for storing different types of data and software instructions or executable code. Memory 110 may also be used to store portions of application 120, graphics API 126, graphics libraries 128, and OS 130. Display 150 may be any type of display device coupled to or integrated with system 100. Examples of such display devices include, but are not limited to, a cathode ray tube (CRT) monitor, light emitting diode (LED) display, and touch-screen display. Display 150 may be used to display graphics and other types of data, which may be output by GPU 142 or a display controller (not shown) of system 100. In some implementations, display 150 may be replaced by an external storage device so that computations performed by CPU 140 and GPU 142 can be stored for later used. The stored computational data can be used by, for example, other hardware and/or software processing stages that may be implemented for relatively more complex hardware/software processing environments than that shown in FIG. 1.

While not shown in FIG. 1, it should be noted that system 100 may be a component of a larger and more complex hardware system. Accordingly, system 100 may include additional software and hardware components including, for example, different software and hardware interfaces for sending and receiving information to and from various sources. Such an interface may include a communications interface and links for sending and receiving information to and from a remote computer over high-speed interconnects or a local-area or wide-area network, such as the Internet. System 100 may also include an interface for performing input/output (I/O) from/to local/remote users and devices, for example, a mouse, QWERTY keyboard, touch-screen, camera, microphone, a T9 keyboard, and any other physical and/or electronic device capable of receiving and/or sending I/O. Accordingly, display 150 may be used as an output device to present information in response to input received from a user, device component, or networked computing device.

CPU 140 in this example may be one or more general-purpose processors for reading and executing software instructions, including code and data, stored in a computer-readable storage medium (e.g., memory 110). The code and data may be associated with an application program (e.g., application 120) executable by CPU 140 at system 100 or by both CPU 140 and GPU 142 in newer hybrid processor systems that seamlessly integrates both types of hardware. GPU 142 may be a dedicated processor or specialized electronic circuit that operates in conjunction with CPU 140 to provide hardware accelerated data processing capabilities for system 100. However, for purposes of this example only, it is assumed that CPU 140 natively supports higher-precision floating-point data formats more optimally than GPU 142. For example, CPU 140 may provide native support for processing data using 64-bit double-precision or higher-precision data formats while GPU 140 may more optimally support only 32-bit single-precision floating-point data formats. As will be described in further detail below, CPU 140 and GPU 142 may represent different stages of a processing pipeline for processing application data 115 using variable-precision floating-point data formats and presenting the results of such processing, e.g., by rendering or visualizing the processed data, for a user via display 150.

In some implementations, GPU 142 may be a graphics accelerator (or graphics card) communicatively coupled to CPU 140 via an internal data bus or communication infrastructure of computer system 100. Alternatively, GPU 142 and CPU 140 may be fully integrated into the processor and both share processor and hardware resources in the same manner. GPU 142 may be used, for example, to process and render graphics data objects to display 150. The graphics data objects in this example may be stored as part of application data 115 in memory 110. However, it should be noted that GPU 142 is not limited to processing graphical data. Further, GPU 142 may be used to process non-graphical data including, for example, any type of data involving floating-point, matrix, or vector/scalar computations.

Application 120 may be any type of software application program executable at system 100. Application 120 may be implemented, for example, as a standalone application program, as a piece of a larger program being run on various processing systems, or as a plug-in module that is installed as part of a web browser executable at system 100. In an example, application 120 may be a data visualization program for rendering two-dimensional (2D), three-dimensional (3D), and/or four-dimensional (4D) graphical representations/animations of real-world/synthetic objects and/or model simulations. Such objects may include, but are not limited to, subsurface geological features of a petroleum reservoir, as will be described in further detail below. The graphical representation of each object may be stored as, for example, a graphics data object or model in a computer-readable storage medium accessible to system 100. The application data objects may be stored and/or processed using different levels of precision, for example, as either 32-bit single-precision data or 64-bit double-precision data. As described above, the graphics data objects associated with application 120 may be stored in memory 110, e.g., as part of application data 115, for later processing and rendering by GPU 142. It should be noted that application data 115 might also include text and other types of non-graphical data associated with application 120. It should also be noted that embodiments of the present disclosure are not intended to be limited to applications for graphics data processing and visualization.

As shown in FIG. 1, application 120 includes a user interface (UI) manager 122 and a rendering manager 124. In an example, UI manager 122 may provide a graphical user interface (GUI) including an image viewer for displaying the graphics data objects within a view of a 3D virtual environment. The GUI also may include various UI controls that enable a user at system 100 to change the current view of the 3D environment or manipulate the size, position, or orientation of selected objects within the environment. As the user interacts with UI control elements of the GUI, the visual representation of the 3D environment and graphics objects displayed in the GUI's image viewer may be updated automatically in accordance with the received user input.

In an example, relevant portions of application data 115 may be read from memory 110 in response to the user input received by UI manager 122. The portions of application data 115 that are read from memory 110 may include, for example, graphics data objects corresponding to the current view of the 3D environment being presented in the image viewer. In some implementations, the graphics data objects and 3D environment in this example may be rendered and presented within the image viewer based on various commands sent by rendering manager 124 to GPU 142.

In a further example, rendering manager 124 may utilize graphics API 126, graphics libraries 128, and/or OS 130 to send the appropriate commands to GPU 142 for rendering different views of the virtual environment and/or graphics data objects within the image viewer displayed using display 150. Application 120, graphics API 126, graphics libraries 128, and OS 130 may correspond to, for example, different layers of a software stack for implementing the graphics rendering functionality of system 100. Each layer of the stack may be used to provide support features needed by software components located in relatively higher layers that may be located above it in the stack. Accordingly, in this example, application 120 may represent the highest or top layer of the stack, followed by graphics API 126, graphics libraries 128, and OS 130. However, it should be noted that any of these layers might be combined as desired for a particular implementation. For example, in some implementations, graphics API 126 and graphics libraries 128 may be implemented as components of OS 130. In other implementations, application 120 may be part of a larger application that runs on multiple hardware system units.

As the base or bottom layer of the software stack in this example, OS 130 may provide a low-level interface between the hardware resources, including GPU 142, and the other software components of system 100. OS 130 may also provide windowing functionality to support the various UI controls, e.g., provided via the above-described GUI of application 120, and to facilitate interaction with the user and obtain user input and instructions.

Graphics libraries 128 may represent the next layer above OS 130. Graphics libraries 128 may include, for example, a set of routines, protocols, and utilities that may be used to implement the graphics functionalities of system 100. The routines may be accessible to rendering manager 124 of application 120 (and other software applications executable at system 100) via, for example, graphics API 126, e.g., the layer above graphics libraries 128. In an example, graphics API 126 may provide rendering manager 124 with access to different rendering and state control functions that can be used to change one or more selected visual properties of a rendered graphics data object. Examples of such visual properties include, but are not limited to, lighting, materials, texture, and transparency. The particular state control and other rendering functions accessible through graphics API 126 may be defined by graphics libraries 128. Examples of other rendering functions defined by graphics library 128 may include, but are not limited to, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer. Graphics libraries 128 may be implemented using, for example, one or more standardized graphics libraries including, but not limited to, the Open Graphics Library (OpenGL). In some implementations, graphics libraries 128 can be used to perform partial numerical computations tasks using GPU techniques, since computations performed inside the GPU 142 can be read back into the hardware memory 110 for further processing by the local hardware units or by other hardware units.

To properly render 2D and 3D application data objects to display 150, rendering manager 124 may use graphics API 126 to send the appropriate commands to GPU 142 for generating the proper graphical representation to be presented in the image viewer of the GUI, as described above. As will be described in further detail below in reference to the example shown in FIG. 2, rendering manager 124 may be used as an initial stage of a processing pipeline including CPU 140 and GPU 142 for processing data using variable-precision floating-point data formats.

It should be appreciated that embodiments of this disclosure may be practiced with a variety of computer-system configurations, e.g. any type of computing device containing one or more computer systems 100, or any type of computing device having one or more processors (e.g., CPU 140) and a memory (e.g., memory 110) for executing and storing instructions. Examples of such a computing device include, but are not limited to, a server, computer clusters, a desktop computer, a laptop computer, a tablet or other handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these computing devices or other computing devices. Alternatively, system 100 may be implemented in a distributed-computing environment or server farm in which tasks may be performed by multiple processing devices with shared or separate memory components that are linked through a communications network. In a distributed-computing environment, program modules may be located in both local and remote computer-storage media including memory storage devices. The present disclosure may therefore be implemented using various hardware devices, software, or a combination thereof.

Figure 2:
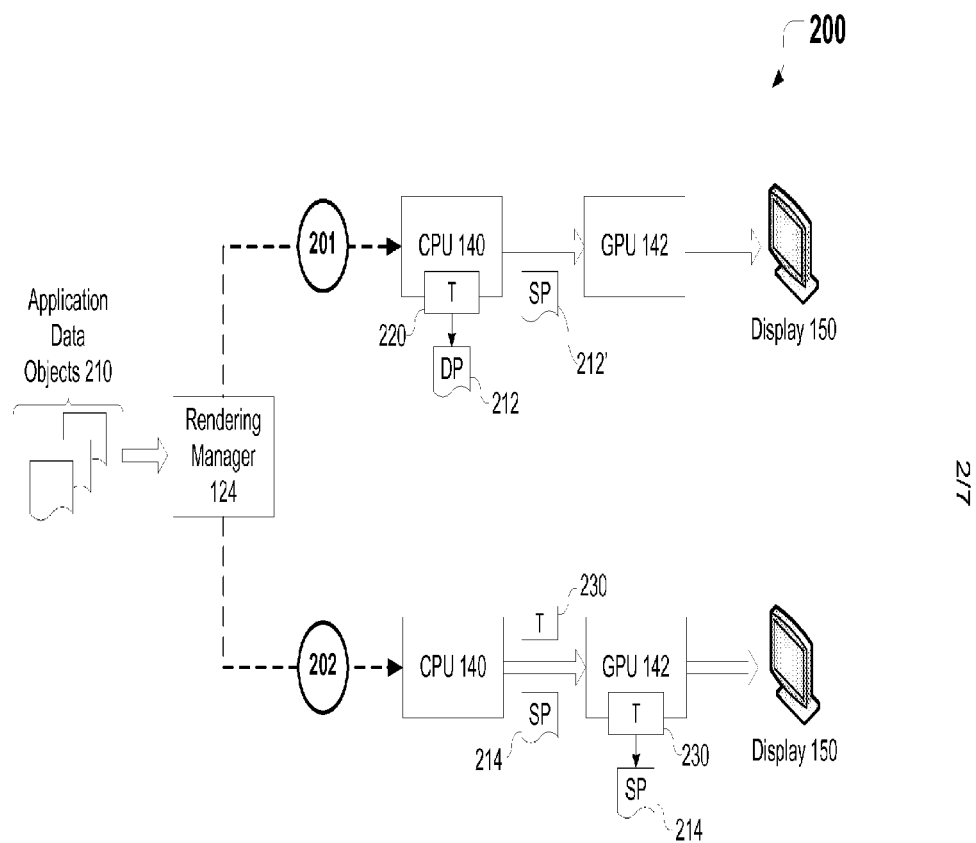
FIG. 2 illustrates an exemplary data processing pipeline including different data flows for processing application data objects using the computer system of FIG. 1.

FIG. 2 illustrates an exemplary data processing pipeline 200 for processing a set of application data objects 210. For purposes of discussion, processing pipeline 200 will be described using computer system 100 of FIG. 1, as described above. However, processing pipeline 200 is not intended to be limited thereto. In the example shown in FIG. 2, application data objects 210 may include different types of data objects associated with an application, e.g., application 120 of FIG. 1, executable at system 100, as described above. In some implementations, the application may be a data visualization program, and application data objects 210 may include graphics data objects to be processed and rendered to display 150. Such graphics data objects may be, for example, graphical models representing different real-world objects to be rendered within a 3D virtual environment, as described above. However, as previously noted, the techniques disclosed herein are not intended to be limited to graphics applications and may be used for processing non-graphical data.

In one example, the aforementioned data visualization application may be used to provide a graphical representation of a petroleum reservoir simulation model. The visualization application in this example may be used to render different views and timelines of the reservoir model including representations of particular attributes (e.g. gas saturation) and features of the reservoir within a virtual 3D environment rendered to display 150. A user, e.g., a reservoir engineer, may interact with a GUI of the application program to manipulate the rendered views, e.g., by changing a position and/or orientation of the model within virtual 3D space. In this way, the application may enable the user to examine particular reservoir features of interest including, for example, selected attributes of reservoir surfaces corresponding to the edges, top, and bottom portions of the reservoir model. Accordingly, the graphics data objects in this example may be representations of various subsurface geological structures across different stratigraphic layers of a reservoir. The graphical representation of each object or structure may be based on, for example, the interpretation of seismic data resulting from the reflection of sonic waves propagated through the underground reservoir formation. The seismic data may be interpreted and used to represent various stratigraphic features associated with the petroleum reservoir including, but not limited to, horizons, volumes, wells, surfaces, and grids, at a particular time or as a series of time events/sequences.

As shown in FIG. 2, application data objects 210 may be provided as input to rendering manager 124. As described above, rendering manager 124 may correspond to an initial stage of a processing pipeline including CPU 140 and GPU 142 for processing data and rendering it to display 150. Also, as described above, CPU 140 may be a general-purpose processing unit that natively supports 64-bit double-precision floating-point data formats. GPU 142 may be a data processing unit that is used to accelerate floating-point computations and that may optimally support only 32-bit single-precision floating-point data formats. However, it should be noted that the techniques described herein may be applied to processing units that support even higher-precision data formats (e.g., quad-precision, octuplet-precision, etc.).

It should be appreciated that GPU 142 in this example may be a dedicated data processing unit having a large array of floating point units (FPUs), e.g., thousands of FPUs, which are designed to perform a large number of floating-point computations in parallel. While the FPUs may have relatively high latencies for processing floating-point data, they also have significant memory bandwidth capabilities to allow the FPU array as a whole to perform efficiently. CPU 140, on the other hand, may have only a small number of FPUs and therefore have only a fraction of the floating-point data processing capabilities of GPU 142. General-purpose processors, such as CPU 140, are typically designed for sequential/branching execution while dedicated data processing units, such as GPU 142, are designed for massive parallel processing of scalar/vector data.

As will be described in further detail below, rendering manager 124 in this example may be used to determine when it would be appropriate to process an application data object using the faster-performance and lower-precision (e.g., 32-bit single-precision) data format of GPU 142 rather than the slower-performance and higher-precision (e.g., 64-bit double-precision) data format of the CPU 140. Further, rendering manager 124 may be used to dynamically select the most appropriate processing data flow option or pathway for a given data object based on the level of precision of the data object relative to a predetermined or selected precision threshold.

Application data objects 210 may comprise, for example, a plurality of data objects having varying levels of precision. Applications data objects 210 may include, for example, a combination of single-precision and double-precision (or even higher-precision) data objects. Each of application data objects 210 may be represented using, for example, any of the IEEE 754 standard variable precision floating-point formats. The floating-point form at used to represent a particular data object may be based on, for example, the level of precision of the data object relative to the precision requirements of the application for a given context or application feature to which that data object pertains. Optionally, when deciding to use a lower precision floating-point format, the numerical range of the data object can be analyzed and adjusted to be closer to one, e.g., the point at which the IEEE 754 binary format precision is maximized. Thus, we can significantly improve the precision of any further computations involving these refactored objects. The values within the adjusted numerical range can be restored for the refactored object by using the GPU 142 hardware acceleration capabilities.

As shown in FIG. 2, processing pipeline 200 includes separate data flows 201 and 202 for processing application data objects 210, including a data object 212 and a data object 214. For purposes of this example, it is assumed that data object 212 is a double-precision (DP) data object and that data object 214 is a single-precision (SP) data object. However, it should be noted that data objects 212 and 214 are not intended to be limited thereto and that each of data objects 212 and 214 may be represented using any of the above-described variable-precision floating-point data formats.

In some implementations, each of the application data objects 210 may comprise a block or chunk of related data derived from a larger application dataset and processed as individual or atomic data units. Further, these data chunks may be sorted according to the different precision requirements of the application. Rendering manager 124 may analyze each data chunk or application data object to determine a level of precision for that data object. The level of precision of each data object may then be used to calculate one or more bounding values for that data object. The number of bounding values calculated for a particular data object may depend on, for example, whether or not the data object is within a desired level of precision or needs to be adjusted to improve the overall computational precision, e.g., by normalizing the data to be within a desired range of values or by confirming that the object precision values are within the precision target needed by the computing application, module, or graphics. Rendering manager 124 may then select the most appropriate data flow and corresponding set of hardware resources to utilize for processing the data object based on the determined level of precision. This may include, for example, calculating the minimum and maximum extents of the data to be processed by the computing hardware. In some implementations, the bounding value(s) or minimum and maximum extents may be for a bounding volume of a graphics data object or set of objects to be processed. In an example, data objects 212 and 214 may be graphics data objects corresponding to different parts of a 3D graphical model, and the bounding volume may be a bounding box, e.g., in the form of a 3D cube or 2D square or rectangle. Rendering manager 124 may then determine whether the calculated bounding value(s), e.g., minimum and maximum extents, exceed a predetermined or selected precision threshold or limit. The rendering manager 124 will apply a set of linear transforms 220 to the minimum and maximum extent values and determine if the transformed extents exceed the desired threshold targets. If it is determined that these extents do not exceed the desired threshold, then rendering manager 124 may direct the graphics object to be rendered using the GPU 142 hardware accelerated transforms. This allows optimal processing of all of the data associated with the object. This also allows the data to be processed without having to rely on the relatively slower CPU 140 to reprocess the entire data every time a parameter associated with one or more of the linear transforms 220 changes. The rendering manager 124 precision threshold test uses the slower CPU 140 double precision capabilities to process only the extent values of the graphics object.

The precision threshold may be based on, for example, a desired level of precision for representing each of the application data objects 210. The precision threshold may correspond to the upper limit of the range of numerical values that can be represented using a selected precision binary floating-point data format. For example, the range of integer values that may be represented using the IEEE 754 standard 32-bit single-precision binary floating-point format is 1 to 16,777,215 (or $2^{24}-1$), where the number of significant bits is 24 (23 explicit bits+1 implicit) and the difference between successive numbers (or "gap") is 1. Thus, the precision threshold and binary floating-point format in this example may need to be adjusted if the maximum integer value to be represented for a desired level of precision exceeds the upper limit of 16,777,215. Similarly, the precision threshold or limit may be adjusted based on the desired numerical precision between successive floating point numbers, e.g., according to a particular gap value. The precision threshold can be selected to ensure that all the targeted integer range values will be accounted for in the computations and processed correctly. This helps to protect application programs from common computational errors when representing integers with floating point numbers.

The integer/floating values associated with each data object in this example may correspond to a set of coordinates that may be used to graphically represent the object in 2D, 3D, 4D, etc. coordinate space. For example, each of data objects 212 and 214 may be defined by a collection of points, where the position of each point can be mapped to a set of coordinates within a virtual 3D environment, as described above. The collection of points and coordinates for each object may therefore be used to define the object's location, orientation, size, and shape within the 3D environment. However, in order to properly represent data objects 212 and 214 within a view of the 3D environment to be rendered to display 150, one or more linear transformations (or transforms) may need to be applied to each data object. This may include, for example, transforming a set of coordinates associated with each object from a default or local coordinate space to a real-world 3D coordinate space, e.g., according to the particular view of the 3D environment being rendered. Examples of different transforms that may be applied to data objects 212 and 214 include, but are not limited to, translations, rotations, unit conversions, and scaling. In the reservoir simulation example described above, the transforms also may include geodetic datum corrections and true vertical depth (TVD/TVDSS) calculations.

In some implementations, data objects 212, 214, and other application data objects 210 may be organized in a hierarchical data structure, such as a scene graph. As will be described in further detail below with respect to FIGS. 3A and 3B, the scene graph may include a hierarchy of parent and child nodes representing various graphics data objects to be rendered as part of a graphical scene. The scene graph also may include one or more transform nodes that define the types of transforms to be applied for each data object. The objects (or nodes corresponding thereto) may be arranged according to their logical and spatial relation to each other and in relation to a graphical scene, e.g., a particular view of the 3D environment, in which the objects are to be rendered. In the above-described reservoir simulation example, the scene graph may represent the spatial relationship between different layers of horizons, volumes, and/or other stratigraphic features within a reservoir formation, where each node may represent a particular stratigraphic feature (e.g., a volume or horizon) that is a parent or child to at least one other node representing another feature (e.g., a different horizon or volume) within the hierarchy. However, it should be noted that the scene graph and graphics data objects are not intended to be limited to stratigraphic features of a reservoir simulation model and that the graphics data objects within the scene graph may be representations of any set of real-world or virtual objects to be rendered as part of a graphical scene to a display (e.g., display 150 of FIG. 1, as described above).

Figure 3A:
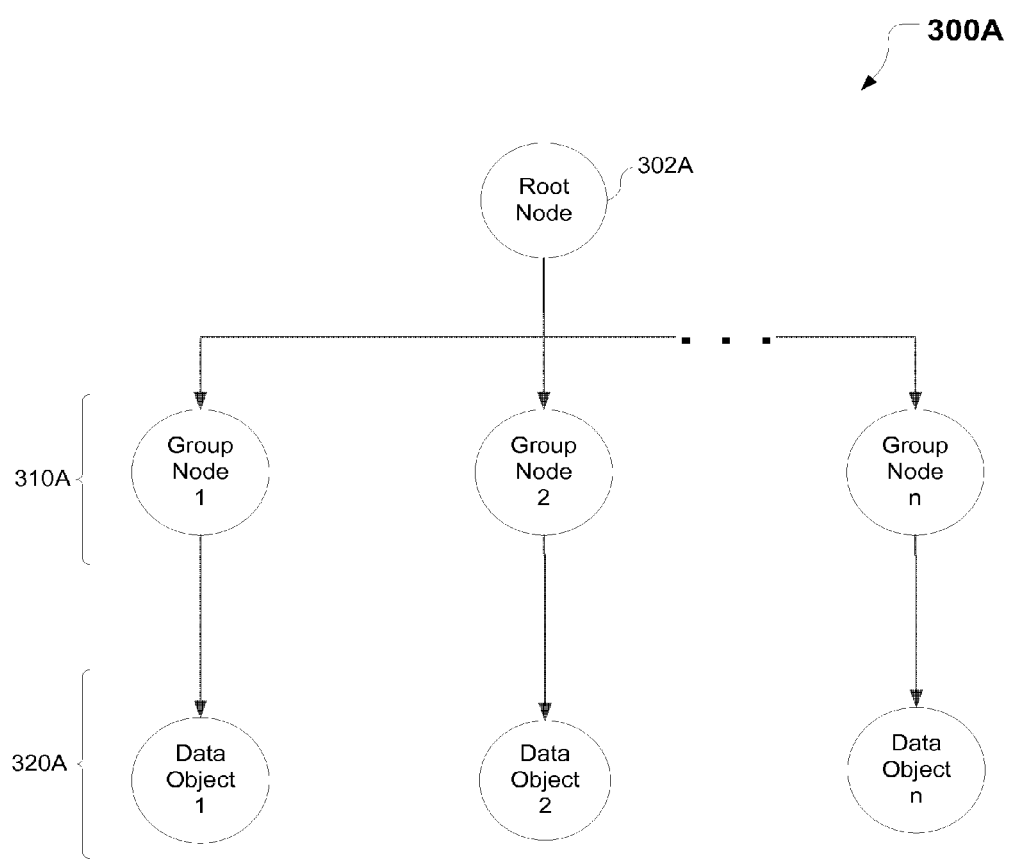
FIGS. 3A and 3B illustrate exemplary scene graphs for representing application data objects as a collection of nodes within a hierarchical tree structure.
Figure 3B:
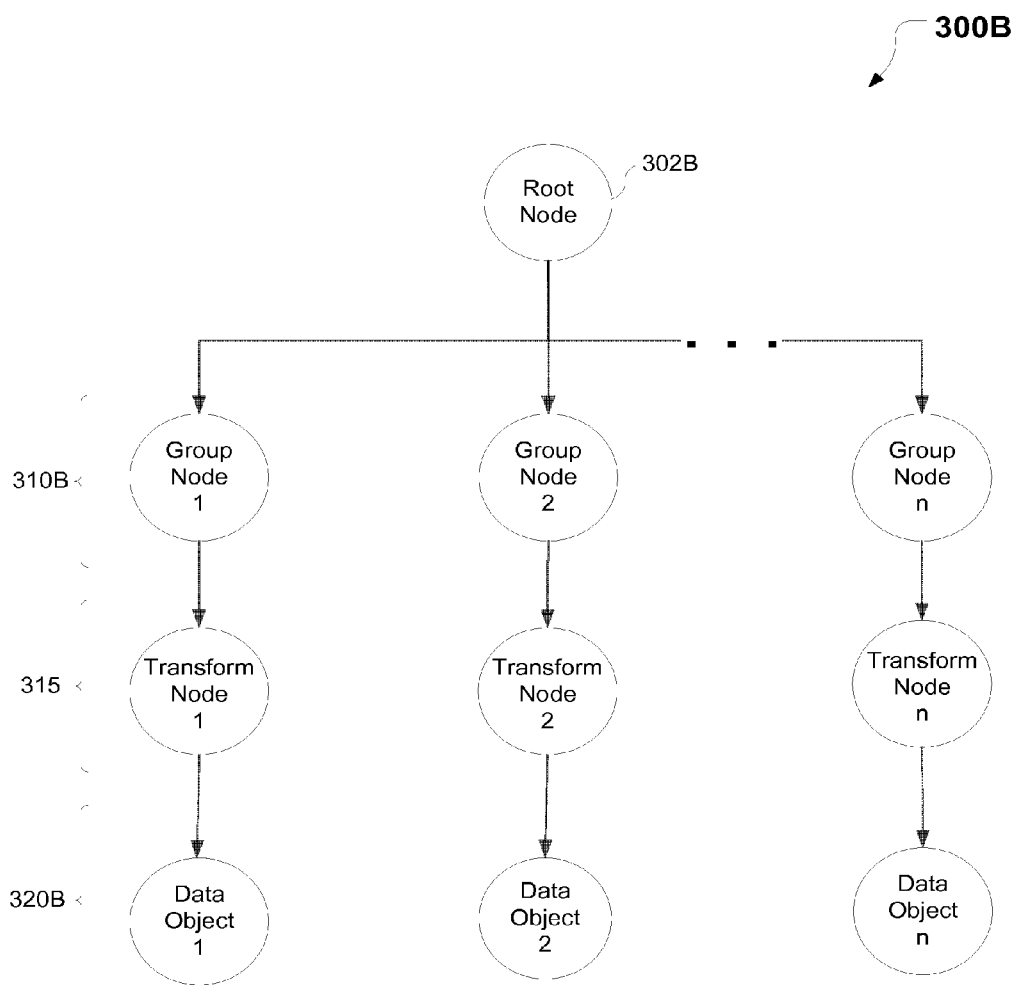

FIGS. 3A and 3B illustrate exemplary scene graphs 300A and 300B, respectively, for representing graphics data objects as a collection of nodes within a hierarchical tree structure. In an example, scene graphs 300A and 300B may be different versions of a scene graph used to represent the same set of application data objects for processing by either the CPU or the GPU. Scene graph 300A may be, for example, a representation of the application data objects to be processed by the CPU, and scene graph 300B may be another representation of the application data objects to be processed by the GPU. As shown in FIG. 3A, scene graph 300A includes a hierarchy of nodes starting from a root node 302A and ending with leaf nodes corresponding to different data objects 320A. Also, as shown in FIG. 3A, each of the data objects 320A may be associated with at least one of various group nodes 310A. Each of the group nodes 310A may represent, for example, a group of related data objects. Although FIG. 3A shows only a single data object 320A for each group node 310A, it should be appreciated that each group node may be associated with multiple data objects. Scene graph 300B of FIG. 3B is similar to scene graph 300A but also includes transform nodes 315 that are associated with each of various data objects 320B and/or their corresponding group nodes 310B. Transform nodes 315 may be used to specify parameters for the set of linear transforms to be applied to a particular data object or group of data objects that may be associated with the same group node. Further, each transform node may include, for example, a transform matrix that specifies the particular linear transforms to be applied to each of the corresponding data objects 320B. The transform matrix may also specify various transform parameters, whose values may be changed in order to apply the transform in different ways. By using the transform node, within the specified transform parameter guidelines, the application can simply modify the transform matrix transform parameters and avoid having to use the slower CPU 140 to reprocess the entire object data. This also assures that the transformed object data is within the required precision boundaries, which permits the use of GPU 142 transforms which are easier to change relative to data changes.

Referring back to FIG. 2, rendering manager 124 may use the pre-calculated native data object minimum and maximum values of data objects 212 and 214 and apply the linear transforms to the extent which will then be used for later precision threshold calculations . . . . In an example, rendering manager 124 may use the IEEE 754 64-bit double precision capabilities of CPU 140 to obtain the transformed double-precision bounding box extent values for each data object based on the transformation operations to be performed for that object. Rendering manager 124 may then compare the transformed double-precision bounding box extent results for each of data objects 212 and 214 to a selected precision threshold in order to determine whether the data object should be processed using data flow 201 or data flow 202. As described above, the selected precision threshold may be, for example, the maximum or upper limit of integer values that can be represented using the IEEE 754 32-bit single-precision data format or may be a graphics related precision threshold.

In the example shown in FIG. 2, if the bounding box extent values calculated for data object 214 are determined to be smaller or equal to the precision threshold, rendering manager 124 may select data flow 202 for processing data object 214. As shown in FIG. 2, data flow 202 involves using GPU 142 to process data object 214. The processing performed by GPU 142 may include applying one or more transforms 230. Transforms 230 may include, for example, hardware-based linear transforms, e.g., OpenGL transforms, which can be applied to data object 214 directly in the hardware of GPU 142 itself. As such, the entire data contained in data object 214 can be hardware processed by GPU 142 without having to rely on CPU 140, thereby leaving CPU 140, and other hardware resources, free to perform other data processing functions while executing the application. Thus, transforms 230 may be applied by GPU 142 without any impact on application execution time and allowing the object data to become a constant whenever a transform parameter changes. In contrast, data object 212 is dynamically changed whenever a transform parameter changes, forcing the CPU 140 to fully process all the object data values with the associated CPU 140 processing load and associated hardware resources overhead. Further, data flow 202 allows rendering manager 124 to leverage the high-performance single-precision data processing capabilities of GPU 142, which can significantly improve application performance and reduce its memory and bandwidth requirements, thereby freeing up system resources for other applications.

While data object 214 is shown in the example of FIG. 2 as being a single-precision (SP) data object, data object 214 is not intended to be limited thereto. Thus, in a different example, data object 214 may be a double-precision data object, e.g., as initially represented and processed by CPU 140 using a double-precision floating-point data format. However, rendering manager 124 may nevertheless determine that the bounding value(s) calculated for data object 214 are still within the selected precision threshold and therefore select data flow 202 as the optimal data flow for processing data object 214.

As shown in FIG. 2, CPU 140 may still be used in data flow 202 to perform various pre-processing operations that may be necessary to prepare data object 214 for processing by GPU 142. Such pre-processing operations may include, for example, performing any necessary format conversions, e.g., for converting data object 214 from a double-precision floating-point format to the single-precision format supported by GPU 142. The latter format conversion is just needed once for data flow 202, since the data object 214 may be stored as a static data object, e.g., as one of data objects 320B within scene graph 300 B of FIG. 3B. In contrast, data flow 201 may require the format conversion to be executed each time the linear transform parameters change for data flow 201 since some or all of the values of data object 212' may change after each CPU 140 transformation processing event and thereby, preventing the previously stored values associated with data object 212' (e.g., with one of data objects 320A within scene graph 300A of FIG. 3A) from being reused. The operations performed by CPU 140 may also include determining appropriate computational hardware parameters (e.g., transform matrix for transforms 230) to be applied to data object 214 by GPU 142. Similar to data flow 201, rendering manager 124 may use CPU 140 to generate an output dataset using a single-precision floating-point format based on data object 214 and the associated parameters for processing by GPU 142. The processing performed by GPU 142 for data object 214 in data flow 202 may be hardware-accelerated floating-point computations including, for example, hardware-based transforms applied to data object 214. The hardware-based linear transforms applied by GPU 142 may be based on, for example, different transform parameters of a transform matrix associated with data object 214, e.g., within the output data set generated using CPU 140, as described above. In some implementations, upon determining that the level of precision of data object 214 does not exceed the selected precision threshold, data object 214 may be passed directly to GPU 142 for processing, thereby avoiding the further use of CPU 140 for data processing operations involving different variable-precision floating-point data formats. A major advantage of using the hardware transform capabilities of GPU 142 as opposed to CPU 140 for processing a data object is that any transform-related changes for the data object require modifications only to the data object's transform parameters in a transform node of a scene graph, without requiring changes to the data object itself or an entire data node corresponding to the object in the scene graph. Thus, the techniques disclosed herein provide a mechanism to maximize the overall performance and execution speed of a computation-intensive application while reducing IEEE 754 floating-point issues caused by variable-precision application data. The techniques disclosed here further provide a way to fine-tune application performance based on the desired computational precision and accuracy.

As an alternative to data flow 202, rendering manager 124 may select data flow 201 for processing data object 212, for example, if the transformed bounding box extent values calculated for data object 212 exceed the selected precision threshold or limit. Extent values greater than the selected precision threshold may indicate that using GP U 142 to process data object 212, e.g., by applying one or more transforms 220, may lead to significant overflow or an unacceptable loss of precision. Thus, as shown in FIG. 2, data flow 201 involves using CPU 140 to process data object 212. The processing performed by CPU 140 may include, for example, a predetermined set of operations, including multiple floating-point computations needed to apply transforms 220 to the entire data in data object 212'. Also, to preserve the original application data for further use, CPU 140 may need to use a separate working copy of data object 212 since the processing changes the data object 212 data every time there is a transform parameter changes. Accordingly, CPU 140 may have to perform additional memory allocations and data duplication operations for storing a working copy of data object 212 to be processed. Also, in contrast to the hardware-based transforms applied by GPU 142, the transformed data may not be able to be reused, in 320A, since changes made to any of the transforms 220 or linear transform parameters require CPU 140 to reprocess and reapply the transforms for all of the data and node 320A to be replaced each time. As CPU 140 in this example performs data processing operations using double-precision (64-bit) data formats, the processed 64-bit data needs to be converted to the single-precision (32-bit) format supported by GPU 142. As shown in FIG. 2, CPU 140 may generate a single-precision output dataset 212' for GPU 142 which will contain the processed and converted data object 212 values.

The use of double-precision data and the additional data processing operations performed by CPU 140, as described above, causes a significant reduction in system performance and available resources, particularly as the size of the data objects being processed grows larger. Thus, having the option of data flow 202 may provide a significant reduction of redundant data, memory allocations, and unnecessary processing by CPU 140, particularly when executing high performance visualization applications. A smaller memory footprint and optimized application performance also enables such applications to be more user interactive/responsive and to be executed more effectively on mobile devices, e.g., laptops, tablets, mobile phones, etc. Moreover, having the capability to dynamically select which hardware resources (e.g., CPU 140 or GPU 142) to utilize for processing application data objects using variable-precision floating-point formats allows the run-time performance of the application to be adjusted or fine-tuned according to a desired level of precision for a given application usage context, e.g., particular workflow, early data overview schemes, visualization, or particular data type.

Figure 4:
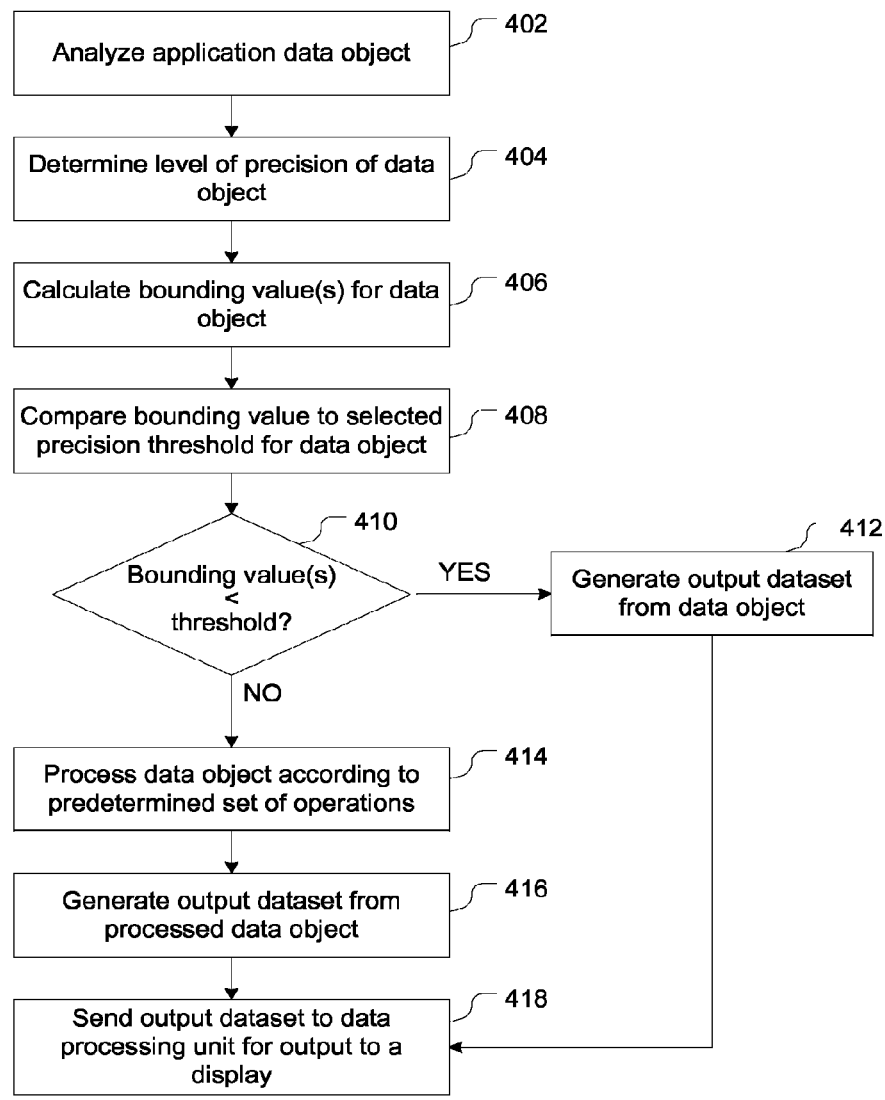
FIG. 4 is a process flowchart of an exemplary method for optimizing hardware resource utilization when processing application data objects with varying levels of data precision.

FIG. 4 is a process flowchart of an exemplary method 400 for controlling hardware resource utilization when processing application data objects with varying levels of precision. For purposes of discussion and explanation, method 400 will be described using computer system 100 of FIG. 1, as described above. However, method 400 is not intended to be limited thereto. Also, for discussion purposes, method 400 will be described using data processing pipeline 200 of FIG. 2, as described above, but method 400 is not intended to be limited thereto. As shown in FIG. 4, method 400 includes steps 402, 404, 406, 408, 410, 412, 414, 416, and 418. The steps of method 400 may be implemented using, for example, rendering manager 124 and CPU 140 of FIGS. 1 and 2, as described above.

Method 400 begins in step 402, which includes analyzing and preparing an application data object to be processed. As described above, the application data object may be one of a plurality of data objects associated with an application. Such data objects may include, for example, data objects to be processed by a set of computational parameters/algorithms or graphics data objects associated with a data analysis and visualization application, e.g., application 120 of FIG. 1, as described above. Accordingly, the processing of the application data object may include applying one or more transforms in order to properly render a graphical representation of the data object to a display, e.g., as part of a view of a virtual 3D environment. Additional details regarding the processing of graphical application data objects will be described below with respect to FIG. 5.

Method 400 then proceeds to step 404, which includes determining a level of precision of the application data object to be processed. The level of precision may be targeted so that all integers in a defined computational range are accounted for, or the level of precision may be designed to ensure that the rendering of objects into a display possess certain amount of precision between them, etc. In step 406, at least one transformed bounding value set for the application data object is calculated based on the level of precision determined in step 404. Steps 408 and 410 include determining whether the calculated bounding value exceeds a precision threshold selected for the application data object by comparing the transformed bounding value to the selected precision threshold. If the calculated bounding value set is determined not to exceed the selected precision threshold, method 400 proceeds to step 412, which includes generating an output dataset including the application data object to be processed by a data processing unit. The data processing unit may be, for example, a dedicated math co-processor, graphics accelerator, hybrid processor, or GPU (e.g., GPU 142 of FIGS. 1 and 2, as described above). The generated output dataset is then sent to the data processing unit in step 418 for any additional processing and enabling information related to the application data object to be output to a display (e.g., display 150 of FIGS. 1 and 2, as described above). This may include, for example, outputting or rendering a representation of the application data object to the display.

However, if the bounding value calculated in step 406 is determined to exceed the selected precision threshold, method 400 proceeds to step 414, in which the data object is processed according to a predetermined set of operations. The predetermined set of operations may include, but are not limited to, applying one or more transforms to a copy of the data contained in the data object, as described above. An output dataset is then generated in step 416 based on the processed application data object. As before, the generated output dataset is sent to the data processing unit in step 418 for enabling information related to the processed data object to be output to a display.

Figure 5:
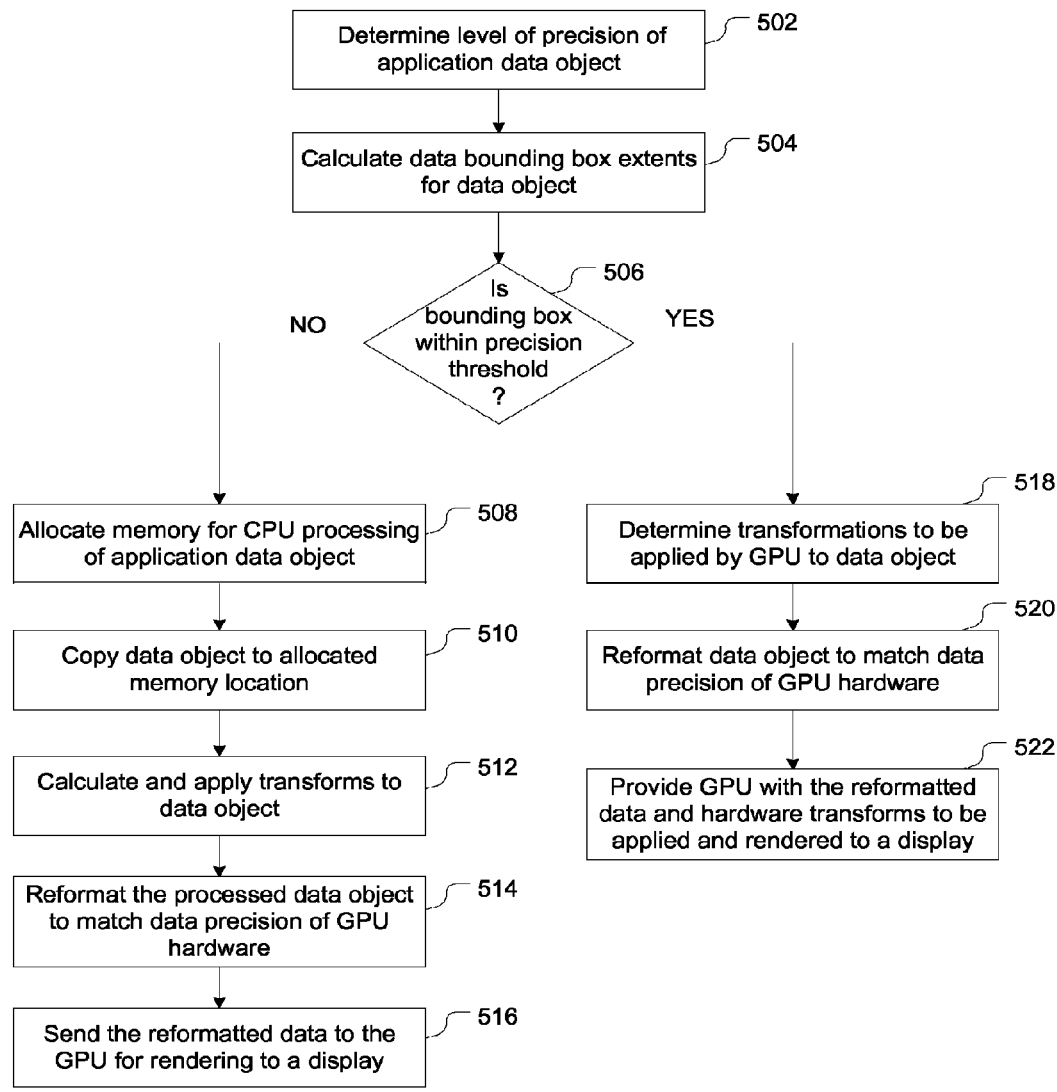
FIG. 5 is a process flowchart of an exemplary method for optimizing hardware resource utilization when processing data objects with varying levels of precision for a graphics application.

FIG. 5 is a process flowchart of an exemplary method 500 for optimizing hardware resource utilization when processing graphics data objects of an application using varying levels of precision. Like method 400 of FIG. 4, method 500 will be described using computer system 100 of FIG. 1 and data processing pipeline 200 of FIG. 2, as described above, for discussion purposes only and is not intended to be limited thereto. Also, like method 400, method 500 may be implemented using, for example, rendering manager 124 and CPU 140 of FIGS. 1 and 2, as described above. As shown in FIG. 5, method 500 includes steps 502, 504, 506, 508, 510, 512, 514, 516, 518, 520, and 522.

Method 500 begins in step 502, which includes determining a level of precision of an application data object to be processed. As described above, the application data object may be one of a plurality of data objects derived from a larger dataset associated with an application (e.g., application 150 of FIG. 1, as described above). Step 504 includes calculating the transformed values of the original minimum and maximum extents of a bounding volume, e.g., in the form of a bounding box, as described above. The application data object may be, for example, a three-dimensional (3D) graphical model, and the bounding value may include a plurality of bounding values corresponding to coordinates of the bounding box in 3D space. Method 500 then proceeds to step 506, which includes determining whether the bounding box extents exceed the precision threshold.

If the bounding box extents exceed the precision threshold, method 500 proceeds to steps 508, 510, 512, 514, and 516. Step 508 includes allocating memory for storing a copy of the double-precision application data object values. In step 510, the application data object double-precision values are copied to the allocated memory location. The resulting data object is then processed in step 512, e.g., by CPU 140 of FIG. 1, by calculating and applying one or more linear transforms for representing the application data object within 3D space or virtual 3D environment, as described above. The application data object in this example may be a graphics data object represented using at least a double-precision data format. The level of precision of the application data object may be relatively higher than the floating-point precision data format supported by the graphics data processing unit or GPU, e.g., GPU 142 of FIGS. 1 and 2, as described above, used to process and render the data object to a display. Thus, the data format of the processed data object may be converted in step 514 to a format that matches the level of precision supported by the GPU. The reformatted data, e.g., in the form of a single-precision output dataset, is then sent to the GPU for processing and rendering to a display, as described above.

Alternatively, if the bounding box extents are determined to be within the precision threshold or threshold limits, method 500 proceeds to steps 518, 520, and 522. Step 518 includes determining the linear transforms to be applied by the GPU to the data object. As the data object may be represented by default using a double-precision data format, the data object may be reformatted in step 520 to match the single-precision format of the GPU hardware, as described above. In step 522, the reformatted data object is sent to the GPU to be processed and rendered to a display. Note that this reformatted data object will not need to be recreated, as it will remain a constant in data object 320B. In an example, a single-precision output dataset including the data object and an indication of the hardware transforms to be applied by the GPU may be generated and sent to the GPU. The indication may be in the form of a transform matrix specifying parameters and/or values of the transforms to be applied, as described above. It should be noted that the steps of method 500 are not necessarily performed in sequential order or the order depicted in FIG. 5 and that two or more of these steps (e.g., steps 518 and 520) may be performed in parallel.

Advantages of method 500 of FIG. 5, as described above, include providing a way to render graphics data without artifacts caused by floating-point binary precision issues and the advantage of only needing to calculate the reformatted data object node once 320B no matter how the transform parameters are changed by the application, since changing the transform parameters just forces a change in the indication (hardware transform matrix parameters). For example, a common visualization technique used to avoid rendering artifacts for relatively large data values (e.g., above a selected precision threshold or value range) is to subtract (e.g., using the CPU) a value from the original data object (e.g., subtract a value from one of a set of coordinates associated with the object) in order to normalize or reduce the data value to a relatively smaller value range, e.g., bringing the data value closer to zero, thereby increasing computational precision while processing the data using a IEEE 754 variable-precision floating-point data format. This may also increase the computational precision of the GPU hardware, thereby enabling the GPU hardware to render the processed data object at a higher detail, without any unwanted rendering artifacts. Such rendering artifacts may be due to any one of various reasons, and a loss of precision during floating-point computations is a very common one. A problem with conventional subtraction-based visualization techniques is that the original data has to be pre-processed by the CPU together with the associated transforms that may need to be applied. Since the transforms generally have to be applied to the data as a whole, a selected precision range may not be optimal for different objects that may have different modeling parameters and precision requirements. In contrast with such conventional normalization techniques, method 500 enables the application data to be broken down into smaller atomic units that can be processed independently as needed. A level of precision for each data unit may be determined by analyzing the potential transformed value ranges of the data unit. Based on this analysis, method 500 allows the data transformation operations to be performed entirely by the GPU, without having to pre-process the data using the CPU first.

Figure 6:
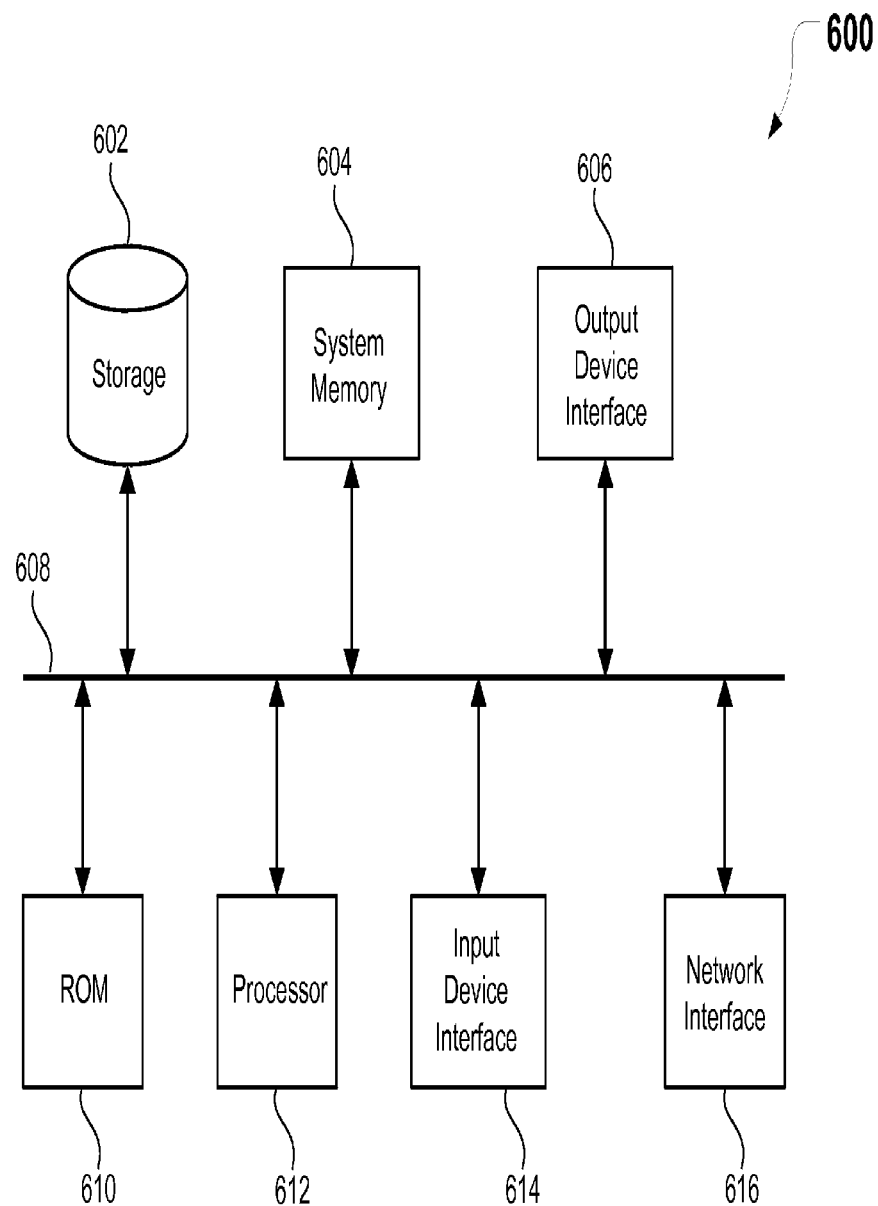
FIG. 6 is a block diagram of an exemplary general-purpose computing system in which embodiments of the present disclosure may be implemented.

FIG. 6 is a block diagram of an exemplary general-purpose computing system 600 in which embodiments of the present disclosure may be implemented. System 600 can be a computer, phone, PDA, or any other type of electronic device. Such an electronic device includes various types of computer readable media and interfaces for various other types of computer readable media. As shown in FIG. 6, system 600 includes a permanent storage device 602, a system memory 604, an output device interface 606, a system communications bus 608, a read-only memory (ROM) 610, processing unit(s) 612, an input device interface 614, and a network interface 616.

Bus 608 collectively represents all system, peripheral, and chipset buses that communicatively connect the numerous internal devices of system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of system 600. Permanent storage device 602, on the other hand, is a read-and-write memory device. This device is a non-volatile memory unit that stores instructions and data even when system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for optimizing hardware resource utilization when processing variable-precision data in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the system 600. Input devices used with input device interface 614 include, for example, alphanumeric, QWERTY, or T9 keyboards, microphones, and pointing devices (also called "cursor control devices"). Output device interfaces 606 enables, for example, the display of images generated by the system 600. Output devices used with output device interface 606 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 6, bus 608 also couples system 600 to a public or private network (not shown) or combination of networks through a network interface 616. Such a network may include, for example, a local area network ("LAN"), such as an Intranet, or a wide area network ("WAN"), such as the Internet. Any or all components of system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of exemplary methods 400 and 500 of FIGS. 4 and 5, respectively, as described above, may be implemented using a computer system including processing circuitry or a computer program product including instructions which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The foregoing methods and systems disclosed herein are particularly useful in optimizing hardware resource utilization when processing variable-precision data. In one embodiment of the present disclosure, a computer-implemented method for optimizing hardware resource utilization when processing variable-precision data includes determining a level of precision of an application data object to be processed, calculating at least one bounding value for the application data object based on the determined level of precision, and determining whether the calculated bounding value exceeds a selected precision threshold. When the calculated bounding value is determined not to exceed the selected precision threshold, an output dataset including the application data object to be processed by a data processing unit is generated. When the calculated bounding value is determined to exceed the selected precision threshold, the application data object is processed according to a predetermined set of operations and the output dataset is generated based on the processed application data object. The generated output dataset is sent to the data processing unit for enabling information related to the application data object to be output to a display.

In a further embodiment of the above-described method, the application data object is a three-dimensional (3D) graphical model, the bounding value includes a plurality of bounding values corresponding to coordinates of a bounding box in 3D space, and the data processing unit is a graphics processing unit. In yet a further embodiment, processing the application data object comprises calculating at least one data transform for representing the application data object within 3D space and applying the calculated data transform to the application data object. In yet a further embodiment, the calculated data transform includes one or more linear transformations to be applied to the application data object. In yet a further embodiment, the predetermined set of operations includes allocating memory for storing a copy of the application data object, copying the application data object to the allocated memory, and applying the one or more linear transformations to the application data object. In yet a further embodiment, the level of precision of the application data object is relatively higher than a data precision associated with the data processing unit for processing data, and generating the output dataset further comprises converting the level of precision of the application data object to the data precision associated with the data processing unit. In yet a further embodiment, the application data object is represented using a double-precision floating-point binary data format, and converting the level of precision of the application data object comprises converting the application data object from the double-precision floating-point binary data format to a single-precision floating-point binary data format. In yet a further embodiment, the application data object includes a plurality of application data objects, where a type of each of the plurality of application data objects is determined and the selected precision threshold is modified for each application data object to be processed based on the determined type of that application data object. In yet a further embodiment, the plurality of application data objects are represented using different nodes of a scene graph. In yet a further embodiment, the scene graph corresponds to a graphical representation of a hydrocarbon reservoir, and the plurality of application data objects correspond to different stratigraphic features associated with the hydrocarbon reservoir being represented. In yet a further embodiment, the different stratigraphic features of the hydrocarbon reservoir include wells, surfaces, horizons, volumes, and grids, and each of the plurality of application data objects include coordinate values representing physical locations of the structural components of the hydrocarbon reservoir. In yet a further embodiment, the different nodes of the scene graph include transform nodes corresponding to the plurality of application data objects, where each transform node specifies parameters for one or more data transforms to be applied to the corresponding data object. In yet a further embodiment, the computer-implemented method further comprises detecting a change in at least one of the transform parameters and when the bounding value is determined to exceed the precision threshold: modifying the scene graph based on the detected change; reprocessing the application data object based on the modified scene graph and data transform parameters specified by the corresponding transform node; and regenerating the output dataset based on the reprocessed application data object. However, when the bounding value is determined to be within the precision threshold, an indication of the detected change is sent to the data processing unit, where the data processing unit is configured to apply the change automatically to the application data object without reprocessing and without having to modify the scene graph.

In another embodiment of the present disclosure, a computer-implemented method for adaptively processing variable precision data comprises determining a level of precision of each of a plurality of application data objects to be processed by a data processing unit, calculating bounding values for each application data object based on the corresponding level of precision determined for that application data object, comparing the calculated bounding values of each application data object with a selected precision threshold for that application data object, generating an output dataset for each application data object based on the comparison, wherein the output dataset includes transform data to be used by the data processing unit for processing the application data object, only when the corresponding bounding values are within the selected precision threshold, and providing the generated output dataset to the data processing unit for processing the corresponding application data object. In a further embodiment, generating an output dataset for each application data object comprises determining whether the calculated bounding values of each application data object exceeds the selected precision threshold and when the bounding values are determined to exceed the selected precision threshold for the application data object, processing the application data object according to predetermined transform operations and generating the output data set based on the processed application data object.

In yet another embodiment of the present disclosure, a system for optimizing hardware resource utilization when processing variable-precision data comprises at least one processor and a machine-readable medium comprising instructions stored therein, which when executed by the processor, cause the processor to perform functions including functions to: determine a level of precision of an application data object to be processed; calculate at least one bounding value for the application data object based on the determined level of precision; determine whether the calculated bounding value exceeds a selected precision threshold; generate an output dataset including the application data object to be processed by a data processing unit when the calculated bounding value is determined not to exceed the selected precision threshold; when the calculated bounding value is determined to exceed the selected precision threshold, process the application data object according to a predetermined set of operations and generate the output dataset based on the processed application data object; and send the generated output dataset to the data processing unit for enabling a representation of the application data object to be output to a display.

In yet another embodiment of the present disclosure, a computer readable medium stores computer-readable instructions, which when executed by a computer (or processor thereof) cause the computer to perform a plurality of functions, including functions to for optimizing hardware resource utilization when processing variable-precision data comprises at least one processor and a machine-readable medium comprising instructions stored therein, which when executed by the processor, cause the processor to perform functions including functions to: determine a level of precision of an application data object to be processed; calculate at least one bounding value for the application data object based on the determined level of precision; determine whether the calculated bounding value exceeds a selected precision threshold; generate an output dataset including the application data object to be processed by a data processing unit when the calculated bounding value is determined not to exceed the selected precision threshold; when the calculated bounding value is determined to exceed the selected precision threshold, process the application data object according to a predetermined set of operations and generate the output dataset based on the processed application data object; and send the generated output dataset to the data processing unit for enabling a representation of the application data object to be output to a display.

Although various embodiments and methodologies have been shown and described, the present disclosure is not limited to such embodiments and methodologies and will be understood to include all modifications and variations as would be apparent to one skilled in the art. For example, although described in the context of a hydrocarbon reservoir application, the present disclosure is also applicable to other fields that involve processing variable-precision binary floating-point data. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method for optimizing hardware resource utilization when processing variable-precision data, the method comprising:
   determining, by a central processing unit, a level of precision of an application data object to be processed, wherein the application data object is one of a plurality of application data objects represented by different nodes of a scene graph, the different nodes including transform nodes corresponding to the plurality of application data objects, each transform node specifying parameters for one or more data transforms to be applied to a corresponding application data object;
   calculating, by the central processing unit, at least one bounding value for the application data object based on the determined level of precision, the at least one bounding value corresponding to a maximum extent of a bounding volume for the application data object;
   determining, by the central processing unit, whether the calculated bounding value exceeds a precision threshold;
   when the calculated bounding value is determined not to exceed the precision threshold, sending, by the central processing unit to a graphics processing unit, the application data object to be processed by the graphics processing unit and rendered to a display device coupled to the graphics processing unit;
   when the calculated bounding value is determined to exceed the precision threshold:
      processing, by the central processing unit, the application data object according to a predetermined set of operations;
      generating, by the central processing unit, an output dataset based on the processed application data object; and
      sending, to the graphics processing unit, the generated output dataset to be rendered to the display device;
   detecting a change in at least one of the parameters specified by the transform node corresponding to the application data object to be processed;
   when the bounding value is determined to exceed the precision threshold:
      modifying the scene graph based on the detected change;
      reprocessing the application data object based on the modified scene graph; and
      regenerating the output dataset based on the reprocessed application data object; and
   when the bounding value is determined to be within the precision threshold, sending an indication of the detected change to the graphics processing unit, the graphics processing unit being configured to apply the change automatically to the application data object without reprocessing and without having to modify the scene graph.

2. The method of claim 1, wherein the application data object is a three-dimensional (3D) graphical model, and the bounding value includes a plurality of bounding values corresponding to coordinates of a bounding box in 3D space.

3. The method of claim 2, wherein processing the application data object comprises:
   calculating at least one data transform for representing the application data object within 3D space; and
   applying the calculated data transform to the application data object.

4. The method of claim 3, wherein the calculated data transform includes one or more linear transformations to be applied to the application data object.

5. The method of claim 4, wherein the predetermined set of operations includes allocating memory for storing a copy of the application data object, copying the application data object to the allocated memory, and applying the one or more linear transformations to the application data object.

6. The method of claim 1, wherein the level of precision of the application data object is relatively higher than a data precision associated with the graphics processing unit for processing data, and the method further comprises converting the level of precision of the application data object to the data precision associated with the graphics processing unit.

7. The method of claim 6, wherein the application data object is represented using a double-precision floating-point binary data format, and converting the level of precision of the application data object comprises converting the application data object from the double-precision floating-point binary data format to a single-precision floating-point binary data format.

8. The method of claim 1, further comprising:
   determining a type of each of the plurality of application data objects; and
   modifying the precision threshold for each application data object to be processed based on the determined type of that application data object.

9. The method of claim 1, wherein the scene graph corresponds to a graphical representation of a hydrocarbon reservoir, and the plurality of application data objects correspond to different stratigraphic features associated with the hydrocarbon reservoir being represented.

10. The method of claim 9, wherein the different stratigraphic features of the hydrocarbon reservoir include wells, surfaces, horizons, volumes, and grids, and each of the plurality of application data objects include coordinate values representing physical locations of the structural components of the hydrocarbon reservoir.

11. A system for optimizing hardware resource utilization when processing variable-precision data, the system comprising:
   at least one processor; and
   a machine-readable medium comprising instructions stored therein, which when executed by the processor, cause the processor to perform functions including functions to:
   determine a level of precision of an application data object to be processed wherein the application data object is one of a plurality of application data objects represented by different nodes of a scene graph, the different nodes including transform nodes corresponding to the plurality of application data objects, each transform node specifying parameters for one or more data transforms to be applied to a corresponding application data object;
   calculate at least one bounding value for the application data object based on the determined level of precision, the at least one bounding value corresponding to a maximum extent of a bounding volume for the application data object;
   determine whether the calculated bounding value exceeds a precision threshold;
   send, to a graphics processing unit, the application data object to be processed by the graphics processing unit and rendered to a display device coupled to the graphics processing unit, when the calculated bounding value is determined not to exceed the precision threshold;
   when the calculated bounding value is determined to exceed the precision threshold:
      process the application data object according to a predetermined set of operations performed by the processor;
      generate an output dataset based on the processed application data object; and
      send, to the graphics processing unit, the generated output dataset to be rendered to the display device;
   detect a change in at least one of the parameters specified by the transform node corresponding to the application data object to be processed;
   when the bounding value is determined to exceed the precision threshold:
      modify the scene graph based on the detected change;
      reprocess the application data object based on the modified scene graph; and
      regenerate the output dataset based on the reprocessed application data object; and
   when the bounding value is determined to be within the precision threshold, send an indication of the detected change to the graphics processing unit, the graphics processing unit being configured to apply the change automatically to the application data object without reprocessing and without having to modify the scene graph.

12. The system of claim 11, wherein the application data object is a three-dimensional (3D) graphical model, the bounding value includes a plurality of bounding values corresponding to coordinates of a bounding box in 3D space, and the processor processes the application data object by performing functions to:
   calculate at least one data transform for representing the application data object within 3D space; and
   apply the calculated data transform to the application data object.

13. The system of claim 12, wherein the calculated data transform includes one or more linear transformations to be applied to the application data object, and the predetermined set of operations cause the processor to perform functions to:
   allocate memory for storing a copy of the application data object;
   copy the application data object to the allocated memory; and
   apply the one or more linear transformations to the application data object.

14. The system of claim 13, wherein the level of precision of the application data object is relatively higher than a data precision required by the graphics processing unit for processing data, and the functions performed by the processor further include functions to convert the level of precision of the application data object to the required data precision of the graphics processing unit.

15. The system of claim 11, wherein the functions performed by the processor further include functions to:
   determine a type of each of the plurality of application data objects; and
   modify the precision threshold for each application data object to be processed based on the determined type of that application data object.

16. The system of claim 15, wherein the scene graph corresponds to a graphical representation of a hydrocarbon reservoir, and the plurality of application data objects represented by the different nodes of the scene graph correspond to different stratigraphic features of the hydrocarbon reservoir.

17. A non-transitory computer-readable storage medium having computer-readable instructions stored thereon, which when executed by a processor cause the processor to perform a plurality of functions, including functions to:

determine a level of precision of an application data object to be processed, wherein the application data object is one of a plurality of application data objects represented by different nodes of a scene graph, the different nodes including transform nodes corresponding to the plurality of application data objects, each transform node specifying parameters for one or more data transforms to be applied to a corresponding application data object;

calculate at least one bounding value for the application data object based on the determined level of precision, the at least one bounding value corresponding to a maximum extent of a bounding volume for the application data object;

determine whether the calculated bounding value exceeds a precision threshold;

send, to a graphics processing unit, the application data object to be processed by the graphics processing unit and rendered to a display device coupled to the graphics processing unit, when the calculated bounding value is determined not to exceed the precision threshold;

when the calculated bounding value is determined to exceed the precision threshold:
process the application data object according to a predetermined set of operations performed by the processor;
generate an output dataset based on the processed application data object; and
send, to the graphics processing unit, the generated output dataset to be rendered to the display device;

detect a change in at least one of the parameters specified by the transform node corresponding to the application data object to be processed;

when the bounding value is determined to exceed the precision threshold:
modify the scene graph based on the detected change;
reprocess the application data object based on the modified scene graph; and
regenerate the output dataset based on the reprocessed application data object; and when the bounding value is determined to be within the precision threshold, send an indication of the detected change to the graphics processing unit, the graphics processing unit being configured to apply the change automatically to the application data object without reprocessing and without having to modify the scene graph.

18. The non-transitory computer-readable storage medium of claim 17, wherein the application data object is a three-dimensional (3D) graphical model, the bounding value includes a plurality of bounding values corresponding to coordinates of a bounding box in 3D space, and the functions performed by the computer include functions to:
calculate at least one data transform for representing the application data object within 3D space; and
apply the calculated data transform to the application data object.

19. The non-transitory computer-readable storage medium of claim 18, wherein the calculated data transform includes one or more linear transformations to be applied to the application data object, and the functions performed by the computer include functions to:
allocate memory for storing a copy of the application data object;
copy the application data object to the allocated memory; and
apply the one or more linear transformations to the application data object.

20. The non-transitory computer-readable storage medium of claim 19, wherein the level of precision of the application data object is relatively higher than a data precision required by the graphics processing unit for processing data, and the functions performed by the computer further include functions to convert the level of precision of the application data object to the required data precision of the graphics processing unit.

21. The non-transitory computer-readable storage medium of claim 17, wherein the functions performed by the computer further include functions to:
determine a type of each of the plurality of application data objects; and
modify the precision threshold for each application data object to be processed based on the determined type of that application data object.

22. The non-transitory computer-readable storage medium of claim 21, wherein the scene graph corresponds to a graphical representation of a hydrocarbon reservoir, and the plurality of application data objects represented by the different nodes of the scene graph correspond to different stratigraphic features of the hydrocarbon reservoir.

* * * * *

UNITED STATES PATENT AND TRADEMARK OFFICE
CERTIFICATE OF CORRECTION

| | | |
|---|---|---|
| PATENT NO. | : 9,959,144 B2 | Page 1 of 1 |
| APPLICATION NO. | : 14/769428 | |
| DATED | : May 1, 2018 | |
| INVENTOR(S) | : Andres C. Callegari et al. | |

It is certified that error appears in the above-identified patent and that said Letters Patent is hereby corrected as shown below:

In the Specification

Column 8, Line 11, change "GUT" to -- GUI --

Column 10, Line 41, change "form at" to -- format --

Column 15, Line 13, change "GP U" to -- GPU --

Column 17, Line 49, change "arc" to -- are --

Signed and Sealed this
Fifth Day of June, 2018

Andrei Iancu
*Director of the United States Patent and Trademark Office*